US011595445B2

(12) United States Patent
Lippert et al.

(10) Patent No.: US 11,595,445 B2
(45) Date of Patent: Feb. 28, 2023

(54) UNIFIED AUTHORIZATION WITH DATA CONTROL LANGUAGE FOR CLOUD PLATFORMS

(71) Applicant: SAP SE, Walldorf (DE)

(72) Inventors: Anett Lippert, Speyer (DE); Juergen Denner, Dudenhofen (DE); Matthias Buehl, Heidelberg (DE)

(73) Assignee: SAP SE, Walldorf (DE)

( * ) Notice: Subject to any disclaimer, the term of this patent is extended or adjusted under 35 U.S.C. 154(b) by 283 days.

(21) Appl. No.: 17/165,060

(22) Filed: Feb. 2, 2021

(65) Prior Publication Data
US 2022/0247787 A1    Aug. 4, 2022

(51) Int. Cl.
*H04L 9/40*    (2022.01)

(52) U.S. Cl.
CPC .............. *H04L 63/20* (2013.01); *H04L 63/08* (2013.01); *H04L 63/102* (2013.01)

(58) Field of Classification Search
CPC ....... H04L 63/20; H04L 63/08; H04L 63/102; H04L 63/0892
USPC ............................................................. 726/1
See application file for complete search history.

(56) References Cited

U.S. PATENT DOCUMENTS

| 2015/0358353 A1* | 12/2015 | Costea ................. G06F 21/554 726/28 |
| 2016/0072843 A1* | 3/2016 | Cam-Winget .......... G06F 9/542 726/1 |
| 2016/0088026 A1* | 3/2016 | Mohamad Abdul .. H04W 12/06 726/1 |

OTHER PUBLICATIONS

Help.sap.com [Online], "Application Security Descriptor Configuration Syntax" Apr. 2020, [retrieved on Apr. 3, 2020], retrieved from: URL <https://help.sap.com/viewer/4505d0bdaf4948449b7f7379d24d0f0d/2.0.03/en-US/6d3ed64092f748cbac691abc5fe52985.html>, 13 pages.

* cited by examiner

*Primary Examiner* — Benjamin A Kaplan
(74) *Attorney, Agent, or Firm* — Fish & Richardson P.C.

(57) ABSTRACT

Methods, systems, and computer-readable storage media for receiving, by an AMS, a policy definition file defining policies to be enforced during execution of an instance of an application within the cloud platform, providing, by the AMS, an enhanced policy definition file indicating authorizations for roles for a policy of the policy definition file, providing an authentication bundle for execution of policy decisions at the instance, the authentication bundle provided based on the enhanced policy definition file, the authentication bundle distributed to application containers within the cloud platform, and during execution of the instance: transmitting, by the instance, an authorization request from the instance to an ADC, the ADC including an OPA and being executed within the container and executing policy decisions based on the authentication bundle, receiving, by the instance, a policy decision from the ADC and enforcing the policy based on the policy decision.

20 Claims, 5 Drawing Sheets

UNIFIED AUTHORIZATION WITH DATA CONTROL LANGUAGE FOR CLOUD PLATFORMS

BACKGROUND

Cloud computing can be described as Internet-based computing that provides shared computer processing resources, and data to computers and other devices on demand. Users can establish respective sessions, during which processing resources, and bandwidth are consumed. During a session, for example, a user is provided on-demand access to a shared pool of configurable computing resources (e.g., computer networks, servers, storage, applications, and services). The computing resources can be provisioned and released (e.g., scaled) to meet user demand.

A common architecture in cloud platforms includes services (also referred to as microservices), which have gained popularity in service-oriented architectures (SOAs). In such SOAs, applications are composed of multiple, independent services, and are deployed in standalone containers with well-defined interfaces. The services are deployed and managed within the cloud platform and run on top of a cloud infrastructure. In SOAs, the primary attention is on communication between services, especially on secure communication. Here, security encompasses several aspects, one aspect including authentication, which has multiple dimensions. Example dimensions include authenticating components calling a service (e.g., a service calling another service, an application calling a service), and authenticating a user on whose behalf the call is made (also referred to as an end user). In some instances, both dimensions are addressed in a single token (e.g., such as an open authentication (OAuth) access token), which authenticates both the calling component and the user.

Within a cloud platform, services can use very different technologies (e.g., databases, programming languages) relative to one another. To enable access to services, each service offers user authorization and authentication, which restricts access to functions and/or data provided by the service. In view of this, different services use role-based access management (RBAC) and attribute-based access management (ABAC), which is either defined by developers of the respective services, or by authorization administrators of enterprises accessing the services. Consequently, administration of authorizations is traditionally decentral and heterogeneous.

SUMMARY

Implementations of the present disclosure are generally directed to security in accessing services within a cloud platform. More particularly, implementations of the present disclosure are directed to an authorization mechanism that enables complex attribute-based authorizations on disparate services across a cloud platform in a centralized and heterogeneous manner.

In some implementations, actions include receiving, by an authorization management service, a policy definition file, the policy definition file defining one or more policies that are to be enforced during execution of one or more instances of an application within the cloud platform, providing, by the authorization management service, an enhanced policy definition file indicating authorizations for one or more roles for at least one policy of the one or more policies of the policy definition file, providing an authentication bundle for execution of policy decisions at each instance of the application within the cloud platform, the authentication bundle being provided based on the enhanced policy definition file, the authentication bundle being distributed to multiple application containers within the cloud platform, and during execution of an instance of the application within a container of the cloud platform: transmitting, by the instance of the application, an authorization request from the instance of the application to an authorization decision controller, the authorization decision controller including an open policy agent and being executed within the container and executing policy decisions based on the authentication bundle, receiving, by the instance of the application, a policy decision from the authorization decision controller, and enforcing, by the instance of the application, the at least one policy based on the policy decision. Other implementations of this aspect include corresponding systems, apparatus, and computer programs, configured to perform the actions of the methods, encoded on computer storage devices.

These and other implementations can each optionally include one or more of the following features: the instance of the application includes a container security library that transmits the authorization request to the authorization decision controller; the policy decisions are executed by the authorization decision controller further based on a role of a user that the authorization request is made on behalf of; the authorization decision controller includes an open policy agent that is executed within the container and that executes policy decisions based on the authentication bundle; the authentication bundle is provided by an authentication bundle provider based on the policy file; providing the authentication bundle at least partially includes compiling the enhanced policy definition file to provide a policy file in a computer-readable policy language; the one or more entities include at least one of a resource, an environment, an action, and a subject; and the policy definition file is written in a data control language (DCL) that comprises structured query language (SQL) statements.

The present disclosure also provides a computer-readable storage medium coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the present disclosure can include any combination of the aspects and features described herein. That is, methods in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DESCRIPTION OF DRAWINGS

Like reference symbols in the various drawings indicate like elements.

DETAILED DESCRIPTION

Figure 1:
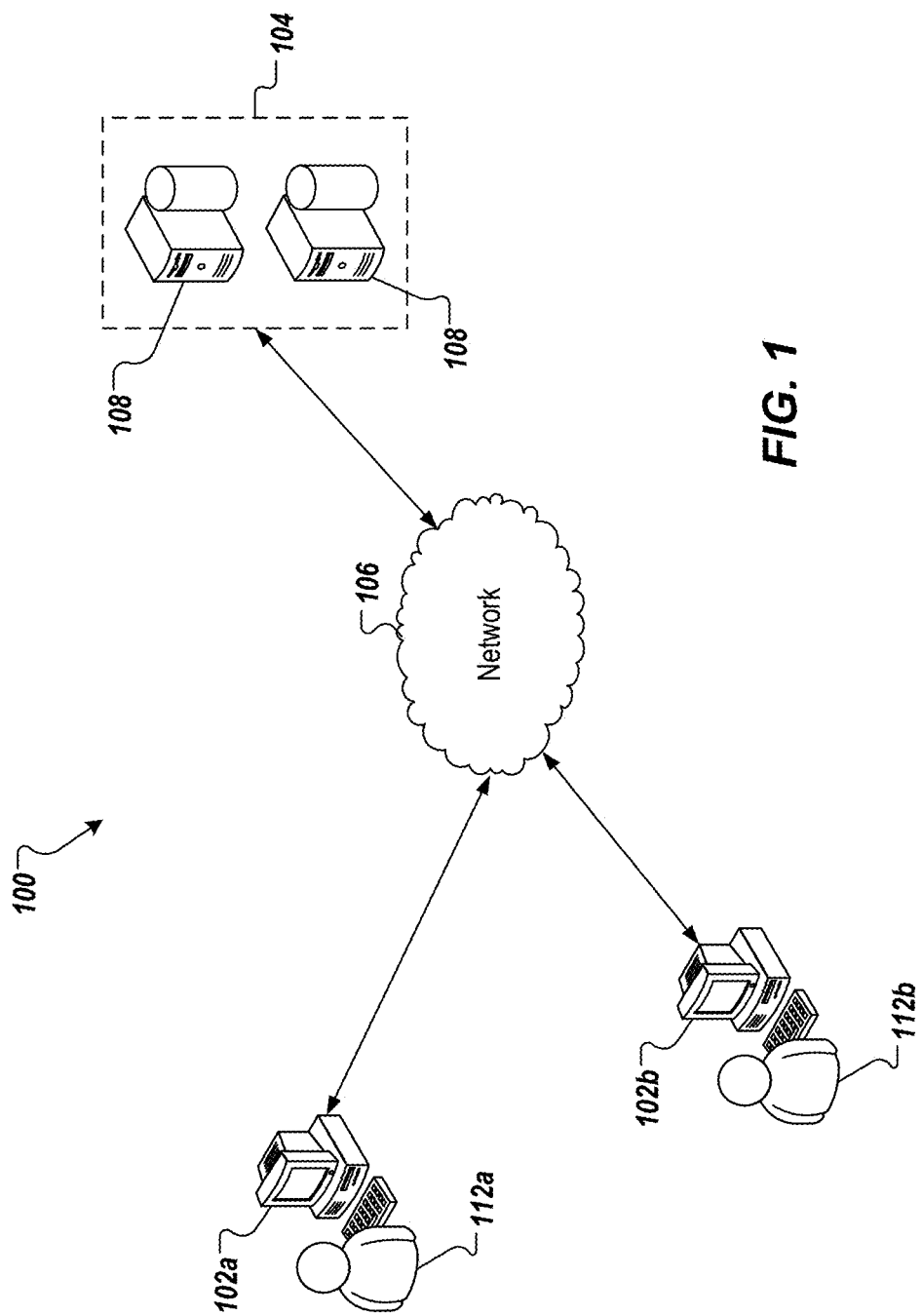
FIG. 1 depicts an example architecture that can be used to execute implementations of the present disclosure.

Implementations of the present disclosure are generally directed to security in accessing services within a cloud platform. More particularly, implementations of the present disclosure are directed to an authorization mechanism that enables complex attribute-based authorizations on disparate services across a cloud platform in a centralized and heterogeneous manner. Implementations can include actions of receiving, by an authorization management service, a policy definition file, the policy definition file defining one or more policies that are to be enforced during execution of one or more instances of an application within the cloud platform, providing, by the authorization management service, an enhanced policy definition file indicating authorizations for one or more roles for at least one policy of the one or more policies of the policy definition file, providing an authentication bundle for execution of policy decisions at each instance of the application within the cloud platform, the authentication bundle being provided based on the enhanced policy definition file, the authentication bundle being distributed to multiple application containers within the cloud platform, and during execution of an instance of the application within a container of the cloud platform: transmitting, by the instance of the application, an authorization request from the instance of the application to an authorization decision controller, the authorization decision controller including an open policy agent and being executed within the container and executing policy decisions based on the authentication bundle, receiving, by the instance of the application, a policy decision from the authorization decision controller, and enforcing, by the instance of the application, the at least one policy based on the policy decision.

As described in further detail herein, implementations of the present disclosure provide an approach to fulfilling requirements regarding complex attribute-based authorizations for heterogeneous and distributed services within cloud platforms. Implementations of the present disclosure can be used for all kinds of services, applications, and cloud platforms (i.e., are not specific to particular services, applications, or cloud platforms). Among other technical challenges, implementations of the present disclosure address the challenge that each service has its own authorizations de-centrally defined, developed, and deployed within different systems, and the challenge that authorization decisions should be done de-centrally (i.e., at the services).

Implementations of the present disclosure enable central and homogeneous administration for all of the differences across services. Further, authorization representations of the present disclosure can be used to transport authorizations between different services, which have different decision engines relative to one another. Implementations of the present disclosure also provide authorization representations in a structured query language (SQL) style to enable inherent complexities to be more easily understandable for developers in defining complex authorizations. That is, in some examples, the authorization representations use syntax of SQL. While syntax is the same, meanings behind the syntax are different. For example, the syntax term GRANT of SQL is used to define a type of rule (e.g., whether the rule is allowed (GRANT) or unallowed (DENY)), instead of assigning any authorization to a user or user group, as used in SQL. As another example, the syntax term WHERE of SQL is used to introduce a condition, instead of a select condition, but an attribute-based authorization condition.

Implementations of the present disclosure are described in further detail herein with non-limiting reference to example technologies including, but not limited to, technologies provided by SAP SE of Walldorf, Germany. It is contemplated, however, that implementations of the present disclosure can be applied with any appropriate technologies. One example technology referenced herein includes a user and authentication (UAA) services, which provides role-based access control (RBAC) for internal services and user-facing applications. An SAP-specific UAA includes XSUAA. Other example technologies include Open Authentication (OAuth 2.0), which can be described as a standard authorization protocol, and Security Assertion Markup Language (SAML) 2.0, which can be described as a standard protocol for exchanging authentication and authorization identities between security domains. In some examples, OAuth 2.0 uses SAML 2.0 for authentication of the users.

Implementations of the present disclosure are also described in further detail herein with non-limiting reference to an example cloud platform. The example cloud platform includes the SAP Cloud Platform, which can be described as an enterprise platform-as-a-service (enterprise PaaS) that provides comprehensive application development services and capabilities, enabling building, extension, and integration of applications in the cloud. The SAP Cloud Platform is described in further detail in SAP Cloud Platform, SAP SE, Mar. 12, 2020, the entirety of which is expressly incorporated herein by reference for all purposes. It is contemplated, however, that implementations of the present disclosure can be applied with any appropriate cloud platform.

To provide further context for implementations of the present disclosure, and as introduced above, cloud computing can be described as Internet-based computing that provides shared computer processing resources, and data to computers and other devices on demand. Users can establish respective sessions, during which processing resources, and bandwidth are consumed. During a session, for example, a user is provided on-demand access to a shared pool of configurable computing resources (e.g., computer networks, servers, storage, applications, and services). The computing resources can be provisioned and released (e.g., scaled) to meet user demand.

A common architecture in cloud platforms includes services (also referred to as microservices), which have gained popularity in service-oriented architectures (SOAs). In such SOAs, applications are composed of multiple, independent services, and are deployed in standalone containers with well-defined interfaces. The services are deployed and managed within the cloud platform and run on top of a cloud infrastructure. In SOAs, the primary attention is on communication between services, especially on secure communication. Here, security encompasses several aspects, one aspect including authentication, which has multiple dimensions. Example dimensions include authenticating components calling a service (e.g., a service calling another service, an application calling a service), and authenticating a user on whose behalf the call is made (also referred to as an end user). In some instances, both dimensions are addressed in a single token (e.g., such as an open authentication (OAuth) access token), which authenticates both the calling component and the user. In some examples, the token can be provided as a JavaScript Object Notation (JSON) Web Token (JWT).

Within a cloud platform, services can use very different technologies (e.g., databases, programming languages) relative to one another. To enable access to services, each service offers user authorization and authentication, which restricts access to functions and/or data provided by the service. In view of this, different services use role-based access management (RBAC) and attribute-based access management (ABAC), which is either defined by developers of the respective services, or by authorization administrators of enterprises accessing the services.

A traditional way to do address disparities between services includes roles and role collections, which are defined either by developers (e.g., within a security file) or by authorization administrators (e.g., within Cloud Cockpit provided by SAP SE). For example, and with non-limiting reference to XSUAA, roles and role collections can be defined in a security descriptor file, referred to as xs-security.json, which can be described as a file that uses JSON to define security options for an application. In some examples, developers store authorization information as design-time role templates in the security descriptor file (xs-security.json). At deployment-time (i.e., the application is deployed for production use), administrators can assign the authorizations to users.

In some examples, the xs-security.json file declares scopes and attributes, on which scope checks and attribute checks can be performed. A non-limiting example of a xs-security.json file includes:

Listing 1: Example xs-security.json file.

```
{
    "xsappname": "node-hello-world",
    "scopes": [
        {
            "name": "$XSAPPNAME.Display",
            "description": "display"
        },
        {
            "name": "$XSAPPNAME.Edit",
            "description": "efdit"
        },
        {
            "name": "$XSAPPNAME.Delete",
            "description": "delete",
            "granted-apps": [
                "$XSAPPNAME(application,business-partner)"
            ]
        }
    ],
    "attributes": [
        {
            "name": "Country",
            "description": "Country",
            "valueType": "string"
        },
        {
            "name": "CostCenter",
            "description": "CostCenter",
            "valueType": "string"
        }
    ],
    "role-templates": [
        {
            "name": "Viewer",
            "description": "View all books",
            "default-role-name": "Viewer: Authorized to Read
```

Listing 1: Example xs-security.json file.

```
           All Books",
            "scope-references": [
                "$XSAPPNAME.Display"
            ],
            "attribute-references": [
                {
                    "name": "Country",
                    "default-values": [
                        "USA",
                        "Germany"
                    ]
                }
            ]
        },
        {
            "name": "Editor",
            "description": "Edit, delete books",
            "scope-references": [
                "$XSAPPNAME.Edit",
                "$XSAPPNAME.Delete"
            ],
            "attribute-references": [
                "Country",
                "CostCenter"
            ]
        }
    ],
    "role-collections": [
        {
            "name": "Editor Viewer",
            "description": "Editor and viewer roles",
            "role-template-references": [
                "$XSAPPNAME.Editor",
                "$XSAPPNAME.Viewer"
            ]
        }
    ]
}
```

In some examples, the role collections defined in the security file are assigned to users and the related authorization is transported to the services using a token, such as a JWT, introduced above. A non-limiting example of a JWT includes:

Listing 2: Example JWT

```
{
    "client_id": "sb-xsapplication!t895",
    "cid": "sb-xsapplication!t895",
    "exp": 2147483647,
    "user_name": "John Doe",
    "user_id": "P0123456",
    "email": "johndoe@test.org",
    "zid": "1e505bb1-2fa9-4d2b-8c15-8c3e6e6279c6",
    "grant_type": "urn:ietf:params:oauth:grant-type:saml2-bearer",
    "scope": [
        "xsapplication!t895.Edit",
        "xsapplication!t895.Delete",
        "xsapplication!t895.Display"
    ],
    "xs.user.attributes": {
        "country": [
            "DE"
        ],
        "CostCenter": [
            "200"
        ]
    }
}
```

However, using tokens, such as JWTs, has several restrictions. An example restriction includes size. For example, the authorization data for a user has to be transported, in the entirety, to the application that does the authorization check. This is to be done at the moment the user logs on. However, tokens, such as JWTs, are transferred as hypertext transfer protocol (HTTP) headers, which have size limits (e.g., 8 KB-16 KB). Further, tokens grow in size as the number of authorizations they contain increases.

Example restrictions also include forwarding of tokens and token exchange. For example, for calling within a sub-account, an application forwards tokens. As another example, when calling cross sub-accounts, token exchange is required. Another example restriction includes isolation. For example, authorizations are contained in the token. When forwarding a token to a third-party service, the third-party service can also call other services on behalf of the user.

Another example restriction includes attributes. In some examples, attributes are modeled within a role, which is based on a role template (e.g., in the xs-security.json). However, attributes are sent as part of a token, within which the attributes are no longer related to a role, but are handled as user-specific attributes. Proper representation of the attributes as belonging to a role, instead of a particular user, in a token is not feasible. There are currently no role attributes implemented. Also, combinations of attributes are not possible (e.g., a user is authorized for country DE and cost center 200 and country EN and cost center 300, but not for country DE and cost center 300 as well as not for country EN and cost center 200). While, in the case of SAP applications, a purpose of XSUAA was initially to integrate with simple cloud services and providing "is user in role" authorization checks, applications have demand for more complex authorizations models. Consequently, the XSUAA roles are relatively limited with respect to RBAC and ABAC. In view of this, services must individually invest their own resources for solving that common requirement.

In view of the above context, implementations of the present disclosure provide an authorization mechanism that enables complex attribute-based authorizations on disparate services across a cloud platform in a centralized and heterogeneous manner. More particularly, implementations of the present disclosure provide a data control language (DCL) based on an authorization model. The DCL enables complex authorizations to be defined in a common way and independent of service-specific characteristics (e.g., service architecture, database, programming language, rules engine (policy enforcement point)). The DCL of the present disclosure is abstract and is transformed into the technology (e.g., configuration or source code for programming languages) of the different enforcement points. In this manner, authorization definitions (provided at design-time) can be done in a standardized way and the runtime for each service is still optimized for the respective service architectures. As described in further detail herein, the DCL of the present disclosure can be implemented using SQL terms. In this manner, the DCL can be readily applied by developers and administrators.

FIG. 1 depicts an example architecture 100 in accordance with implementations of the present disclosure. In the depicted example, the example architecture 100 includes client devices 102a, 102b, a network 106, and a server system 104. The server system 104 includes one or more server devices and databases 108 (e.g., processors, memory). In the depicted example, users 112a, 112b respectively interact with the client devices 102a, 102b.

In some examples, the client devices 102a, 102b can communicate with the server system 104 over the network 106. In some examples, the client devices 102a, 102b includes any appropriate type of computing device such as a desktop computer, a laptop computer, a handheld computer, a tablet computer, a personal digital assistant (PDA), a cellular telephone, a network appliance, a camera, a smart phone, an enhanced general packet radio service (EGPRS) mobile phone, a media player, a navigation device, an email device, a game console, or an appropriate combination of any two or more of these devices or other data processing devices. In some implementations, the network 106 can include a large computer network, such as a local area network (LAN), a wide area network (WAN), the Internet, a cellular network, a telephone network (e.g., PSTN) or an appropriate combination thereof connecting any number of communication devices, mobile computing devices, fixed computing devices and server systems.

In some implementations, the server system 104 includes at least one server and at least one data store. In the example of FIG. 1, the server system 104 is intended to represent various forms of servers including, but not limited to a web server, an application server, a proxy server, a network server, and/or a server pool. In general, server systems accept requests for application services and provides such services to any number of client devices (e.g., the client devices 102a, 102b over the network 106).

In some implementations, the server system 104 can provide a cloud platform (e.g., the SAP Cloud Platform) that hosts cloud-based applications. In some examples, the cloud platform provides a cloud authorization service (CAS) to authorize user access for applications in accordance with implementations of the present disclosure. More particularly, and as described in further detail herein, the user 112a can be a developer of an application that is to be deployed to the cloud platform and can store authorization information as design-time role templates in the security descriptor file (xs-security.json). After the application is developed and deployed to the cloud platform, the user 112b (e.g., an administrator) can assign authorizations to users that will access the application. In some examples, content from the xs-security.json is migrated into .dcl files. In this manner, only .dcl files are provided and xs-security.json files can be absent.

As introduced above, implementations of the present disclosure provide an authorization mechanism using a DCL that is based on an authorization model enabling complex authorizations to be defined in a common way and independent of service-specific characteristics (e.g., service architecture, database, programming language, rules engine (policy enforcement point)). The DCL of the present disclosure is abstract and is transformed into the technology (e.g., configuration or source code for programming languages) of the different enforcement points. In this manner, authorization definitions (provided at design-time) can be done in a standardized way and the runtime for each service is still optimized for the respective service architectures. As described in further detail herein, the DCL of the present disclosure can be implemented using SQL terms for ready application by developers and administrators.

Figure 2:
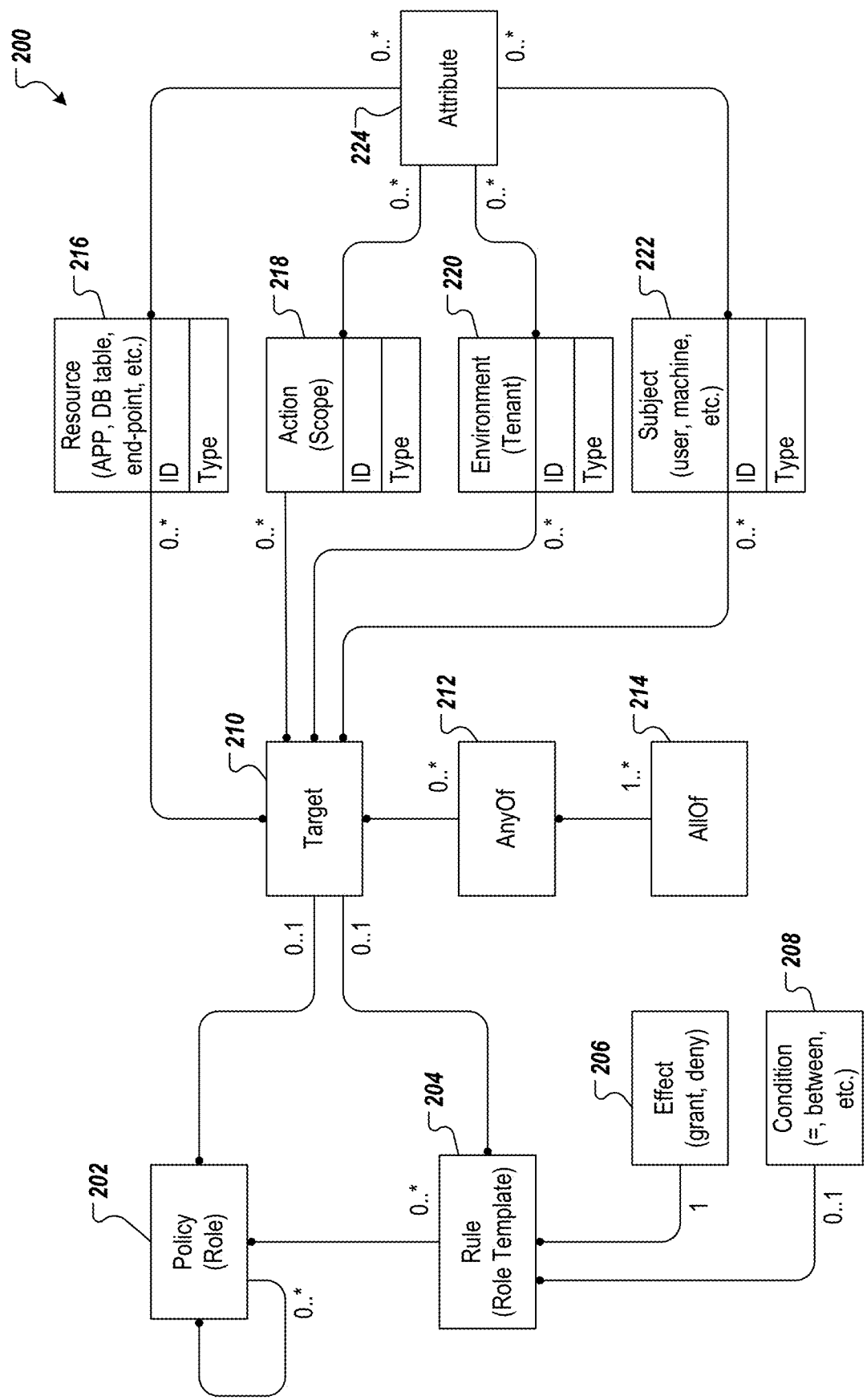
FIG. 2 depicts an example entity model in accordance with implementations of the present disclosure.

In further detail, FIG. 2 depicts an example entity model 200 in accordance with implementations of the present disclosure. The example entity model 200 is a conceptual model of authorizations based on the eXtensible Access Control Markup Language (XACML) specification. In the example of FIG. 2, the entity model 200 includes a set of objects that includes policy 202, rule 204, effect 206, condition 208, target 210, AnyOf 212, AllOf 214, resource 216, action 218, environment 220, subject 222, and attributes 224. The example entity model 200 of FIG. 2 provides a construct for defining policies using the DCL and applied using a CAS in accordance with implementations of the present disclosure.

In some examples, the policy 202 includes one or more rules 204, each rule having one or more conditions 208 that are evaluated to result in an effect 206. For example, if a policy 202 is applied for a particular role, one or more conditions 208 of each rule 204 are evaluated to determine the effect 206 (e.g., grant/deny access to a resource, service, environment). In some examples, the target 210 is what is being protected by application of the policy 202. In some examples, AnyOf 226 represents a logical operator that evaluates to true, as long as one included condition is true. In some examples, AllOf 228 represents a logical operator that evaluates to true when all included conditions are true.

In some examples, the target 210 identified in the policy 202 includes one or more resources 216, one or more actions 218, one or more environments 220, and/or one or more subjects 222, each of which can be particularized with respective attributes 224. Example resources 216 include, without limitation, applications, database tables, and end-points (e.g., HTTP end-points). In some examples, actions 218 include actions that a role is allowed or not allowed to perform per the policy 202. In some examples, environments 220 include environments (e.g., tenants) that a role is allowed or not allowed access to per the policy 202. In some examples, subjects 222 are entities (e.g., users, machines, services) that a role is allowed or not allowed access to per the policy 202.

Figure 3:
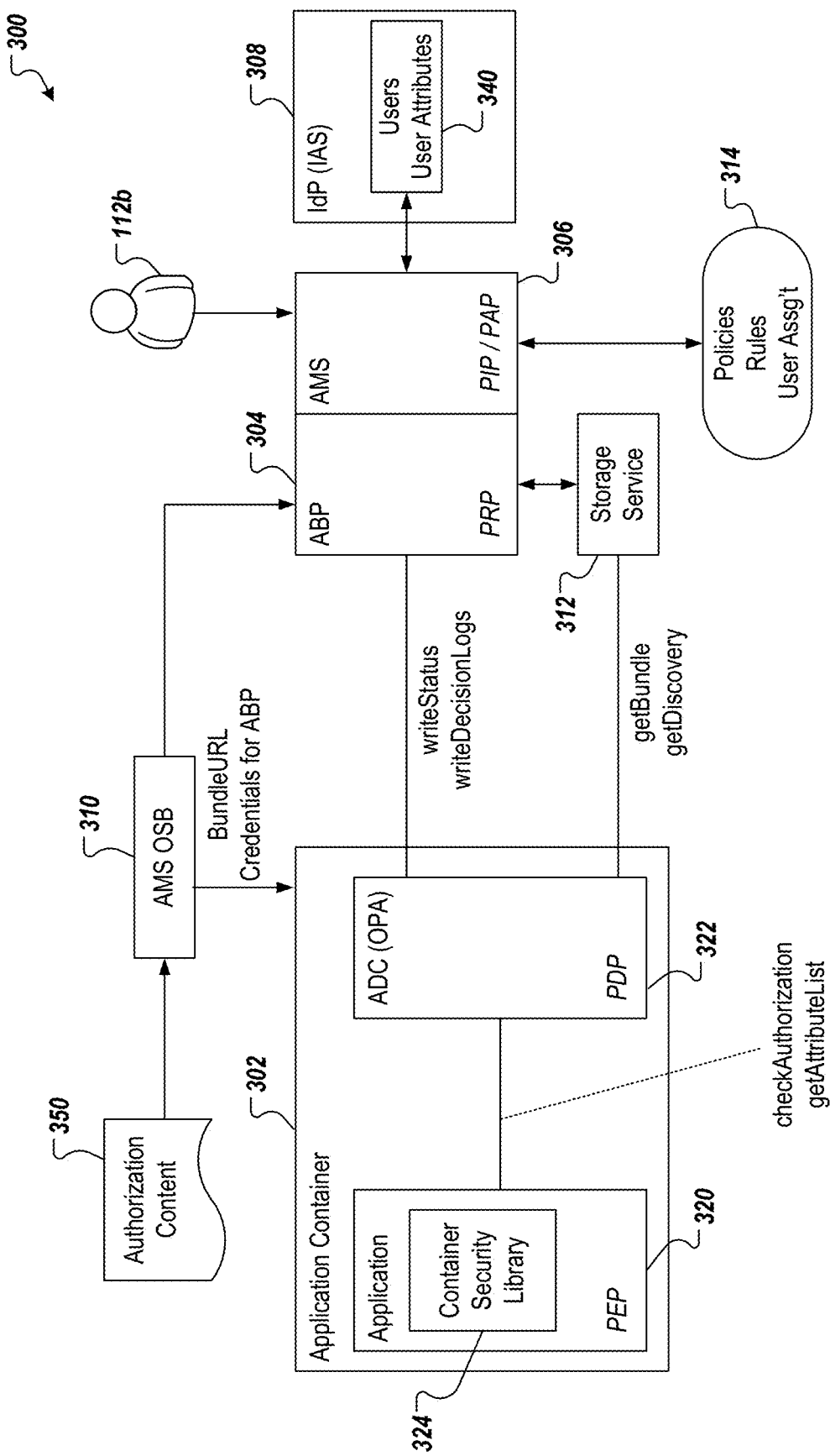
FIG. 3 depicts an example conceptual architecture in accordance with implementations of the present disclosure.

FIG. 3 depicts an example conceptual architecture 300 in accordance with implementations of the present disclosure. In the depicted example, the example conceptual architecture 300 includes an application container 302, an authorization bundle provider (ABP) 304, an authorization management service (AMS) 306, an identity provider (IdP) 308, an AMS open service broker 310, a storage service 312, and a data store 314. In some implementations, a CAS of the present disclosure is provided within the conceptual architecture 300. Components of the CAS can include, without limitation, the ABP 304, the AMS 306, and AMS open service broker 310, each of which is described in further detail herein.

In the context of cloud platforms, the application container 302 executes an application 320. In cloud platforms, containerization is implemented, which can be described as operating system (OS) virtualization. In containerization, applications (or microservices, software processes) are run in isolated user spaces referred to as containers. The containers use the same shared OS, and each provides a fully packaged and portable computing environment. That is, each container includes everything an application needs to execute (e.g., binaries, libraries, configuration files, dependencies). Because a container is abstracted away from the OS, containerized applications can execute on various types of infrastructure. For example, using containers, an application can execute in any of multiple cloud-computing environments.

With continued reference to FIG. 3, the application container 302 includes an application 320 and an authorization decision controller (ADC) 322 (e.g., an open policy agent (OPA)). The application 320 includes a container security library (CSL) 324 and functions as a policy enforcement point (PEP). In some examples, the ADC 322 and the CSL 324 are components of the CAS of the present disclosure.

In accordance with implementations of the present disclosure, the ADC 322 functions as a policy decision point (PDP). The ABP 304 functions as a policy retrieval point (PRP) 330. The AMS 306 function as a policy information point (PIP) and a policy administration point (PAP). The IdP 308 includes a data store 340 of users and user attributes.

In the example of FIG. 3, the PRP and the PAP are centralized and the PDPs are decentralized. That is, there is a PRP and a PAP for multiple, distributed PDPs (i.e., an ADC 322 in each of multiple application containers 302. In some examples, for the ADC 322, OPA is used, which can be described as an open source policy decision engine that runs as a server next to the application 320 (e.g., in a sidecar pattern). In some examples, communication between the ADC 322 (OPA) and the application 320 is done over HTTP using RESTful APIs. The OPA server is in-memory and contains policies and data documents. In some examples, policies are provided in a computer-readable policy language (e.g., REGO) and data documents are provided as JSON files. In some examples, both policies and data documents can be put into the OPA memory either actively by PUT mechanisms through the RESTful APIs or by PULLing so-called bundles through a RESTful API out of another HTTP server. In some examples, the bundles are also used to initially set up the OPA memory with policies and data after deployment.

In further detail, and in some implementations, the ADC 322 (OPA service) is deployed based on a sidecar pattern. For Kubernetes (K8S) the functionality of the main container (in FIG. 3, the application container 302) is extended by a sidecar container. In some examples, the ADC is deployed using multiple buildpacks. Communication between the application 320 and the ADC 322 is done through a local host.

Implementations of the present disclosure provide the AMS 306 as the PIP/PAP and the ABP 304 as the PRP for all OPA servers (i.e., for all application containers 302). Applications that are to use the AMS 306 create a service instance of AMS using the AMS open service broker (OSB) 310. The authorization information is handled and stored within the AMS 306 (e.g., using a noSQL database Mongo). The ABP 304 creates authorization bundles, which are used to distribute policies and data to the OPA servers (i.e., the ADCs 322) and are stored within the storage service 312. In some examples, the storage service 312 is provided as part of the cloud platform (e.g., infrastructure-as-a-service (IaaS) and, as such, has high availability for access by components, such as the ADC 322). The authorization content coming from the application 320 contains the actions, resources, attributes, and initial policies that are relevant for that application 320 with respect to authorization.

In accordance with implementations of the present disclosure, authorization objects are defined using the DCL. Example authorization objects include, without limitation, a policy object and a rule object. In some examples, policy description language (PDL) files contain policies. In some examples, for the definition of policies and rules the actions, attributes and resources out of an authorization content file 350 are used. In some examples, the authorization content file 350 can be provided as AuthorizationContent.json.

In further detail, the DCL is a SQL-like language that is used to define policies and rules. Using DCL, developers and/or administrators can define rules and can combine those rules within policies, which are assignable to users. The DCL includes naming conventions. For example, objects of the AMS 306 include policies, actions, resources, and attributes. The names of actions, resources, and attributes are defined within the application 320 and are sent to the AMS 306 through the AuthorizationContent.json. A set of valid characters of the DCL makes it possible for the developer (of the application 320) to define the names in the same style as all other elements within its development.

In contrast, the usernames and user group names are defined within the IdP 308. Consequently, there is no naming convention mandated for usernames or user group names in the PDL. Within the PDL, all kind of usernames and user group names are to be handled. For example, it should be possible to use unquoted and double-quoted names for users and/or user groups.

In some examples, the name for an AMS object (e.g., policy, action, resource, attribute) can be specified using regular (unquoted) identifiers or delimited (double-quoted) identifiers. For example:

TABLE 1

Example Identifiers of DCL

| | |
|---|---|
| DEFINE POLICY readAll; | Policy name specified using a regular identifier in a DEFINE statement |
| DEFINE POLICY "read All"; | Policy name specified using a delimited identifier in a DEFINE statement |
| GRANT read ON *; | Action name specified using a regular identifier |
| GRANT "read" ON *; | Action name specified using a delimited identifier: |

In some examples, a regular (unquoted) identifier must begin with a letter (A,a through Z,z) and cannot contain any symbols except digits or an underscore (_). In some examples, a delimited identifier must be enclosed within the double quotation (") delimiter and can contain any character, including special characters (e.g., "/wert$zu").

In some examples, a name of a policy must be within a predefined range of number of characters (e.g., from 1 to 127 characters long). In some examples, names are case sensitive (e.g., CUSTOMER and Customer are different). In some examples, a name cannot be the same as another AMS object that has the same type (e.g., there is only one rule with name Admin). In some examples, keywords are case-insignificant (e.g., KEYWORD, keyword, Keyword or KeyWoRd would be valid notations for the same keyword).

In some examples, string values of attributes are always quoted with '. For example:

```
DEFINE POLICY salesOrders {
    GRANT read ON SalesOrders, SalesOrderItems WHERE
    Country = 'DE'
}
```

In some examples, the following condition operators are provided:

TABLE 2

Example Operators of DCL

| Operator | Description |
|---|---|
| = | equal |
| < | less than |
| > | greater than |
| <= | less than or equal |
| >= | greater than or equal |
| < > | no equal |
| IN | specify multiple possible values |
| BETWEEN | between a certain range |

TABLE 2-continued

Example Operators of DCL

| Operator | Description |
|---|---|
| LIKE | search for a pattern |
| NOT IN | specify multiple values which are not possible |
| NOT BETWEEN | values which are not within a certain range |
| NOT LIKE | values that do not match the pattern |

An example attribute constraint is provided as IS NULL meaning that the attribute value is empty. For example:

```
DEFINE POLICY salesOrders {
    GRANT read, write ON SalesOrderItems WHERE Status IS
    NULL;
}
```

In some examples, the DCL provides input parameters for policies. For example, within a policy it is possible to define rules with conditions that contain an Is UNRESTRICTED condition for attributes. In this manner, if such a policy is assigned to a user, it means that the user is fully authorized on the so-designated attributes. Only the actions and resources are still restricted. In some examples, * can be used instead of UNRESTRICTED. In the following non-limiting example, the user is assigned to policy salesOrders and is allowed to read all SalesOrders:

```
DEFINE POLICY salesOrders {
    GRANT read ON SalesOrders WHERE ( Country IS
UNRESTRICTED AND SalesID IS UNRESTRICTED ) OR ( Country IS
UNRESTRICTED AND Name IS UNRESTRICTED);
}
```

As another non-limiting example, with the assignment to policy salesOrdersWinter, the user is allowed to read all SalesOrders where the name contains the string 'Winter', as follows:

```
DEFINE POLICY salesOrdersWinter {
    GRANT read ON SalesOrders WHERE ( Country IS
UNRESTRICTED AND SalesID IS UNRESTRICTED AND Name IS
UNRESTRICTED ) OR ( Country IS UNRESTRICTED AND Name
LIKE
'*Winter*' );
}
```

In some examples, parameters of policies can be filled during use within another policy. Using another non-limiting example, the assignment of use_salesOrders allows the user to read salesOrders within country DE, FR or IT and SalesID 200 or read salesOrders within country DE, FR or IT and name containing the string 'Winter' as follows:

```
DEFINE POLICY use_salesOrders {
    USE salesOrders RESTRICT Country IN ('DE','FR','IT'),
    SalesID = 200, Name LIKE '*WINTER*';
}
```

In some examples, the use can be enhanced with a WHERE condition which is combined with AND to the existing WHERE condition. The WHERE condition must be specified before RESTRICT parts. This is to emphasize that it relevant for all RESTRICT tuples and not only the last one. For example:

```
DEFINE POLICY use_salesOrders {
    USE salesOrders WHERE Status = 'open'
        RESTRICT Country IN ('DE','FR','IT'),
        SalesID = 200,
        Name LIKE '*WINTER*';
}
```

In some examples, the restrict section of a policy can be repeated multiple times to define a list of tuples. For example:

```
DEFINE POLICY salesOrders{
    GRANT read ON SalesOrders WHERE Country IS * AND
SalesID IS * ;
}
DEFINE POLICY use_salesOrders {
    USE salesOrders RESTRICT Country = 'DE', SalesID = 300
        RESTRICT Country = 'FR', SalesID = 200
        RESTRICT Country = 'IT', SalesID = 100;
}
```

It can be noted that the immediately previous example definition is not equivalent to the following example definition, because this would allow any Country by SalesID combination (e.g., 9 combinations versus 3 combinations):

```
DEFINE POLICY use_salesOrders {
    USE salesOrders RESTRICT Country IN ('DE','FR','IT'),
    SalesID IN (300,200,100);
}
```

In some examples, valid data types for attribute values include string, number, Boolean, and null.

In view of the foregoing, several example policy definitions are provided. It is contemplated that the example policy definitions (and any example of the present disclosure) are non-limiting examples. An example policy that allows the user to do action "read" can be provided as follows:

```
DEFINE POLICY readAll {
    GRANT read ON * ;
}
```

An example policy that allows the user to do action "read" and "write" can be provided as follows:

```
DEFINE POLICY readWrite {
    GRANT read, write ON * ;
}
```

An example policy that restricts all resources only on defined attribute values without any action can be provided as follows:

```
DEFINE POLICY CountryCode {
    GRANT * ON * WHERE Country = 'DE' OR Country = 'FR';
}
```

Example policies that that allows the user to do action "read" and all resources with an special attribute value can be provided as follows:

```
DEFINE POLICY salesOrders {
    GRANT read ON * WHERE Country = 'DE';
}
DEFINE POLICY salesOrders {
    GRANT read ON * WHERE Country IN ('DE','FR','BE');
}
DEFINE POLICY salesOrders {
    GRANT read ON * WHERE Country = 'DE' AND SalesID
BETWEEN (100,200);
}
DEFINE POLICY salesOrders {
    GRANT read ON SalesOrders WHERE Name LIKE 'Winter*'
}
```

Example policies with restriction on special resources without any action or any attribute can be provided as:

```
DEFINE POLICY salesOrders {
    GRANT * ON SalesOrders;
}
DEFINE POLICY salesOrders {
    GRANT * ON SalesOrders, SalesOrderItems,
SalesOrderLists;
}
```

Example policies with actions on special resources where additionally attribute values restrict the user authorization can be provided as:

```
DEFINE POLICY salesOrders {
    GRANT read, activate ON SalesOrders WHERE
SalesOrders.Country = 'DE' AND SalesOrders.SalesID BETWEEN
(100,300);
}
DEFINE POLICY salesOrders {
    GRANT read, activate ON SalesOrders, SalesOrderItems
WHERE SalesOrders.Country = 'DE' AND SalesOrders.SalesID
BETWEEN (100,300) AND SalesOrderItems.Country = 'DE' AND
SalesOrderItems.SalesID BETWEEN
(100,200);
}
```

An example policy for the case that all attributes are related to all resources a shorter writing is possible by entering only attributes with values which than relates to all resources can be provided as:

```
DEFINE POLICY salesOrders {
    GRANT read, activate ON SalesOrders, SalesOrderItems
WHERE Country = 'DE' AND SalesID BETWEEN (100,300);
}
```

An example policy with several rules can be provided as:

```
DEFINE POLICY salesOrders {
    GRANT read ON * WHERE Country = 'DE' AND SalesID
BETWEEN (100,200);
    GRANT write ON * WHERE Country = 'FR' AND SalesID
BETWEEN (100,200);
}
```

In some examples, policies can be combined hierarchically. In this manner, a new policy is defined as a container for other existing policies. For example:

```
DEFINE POLICY allAdmins {
    USE salesOrders;
    USE readAll;
}
```

In some examples, a policy that combines policies can also include its own rules. For example:

```
DEFINE POLICY allAdmins {
    USE salesOrders;
    USE readAll;
    GRANT write ON salesOrders WHERE Country IN ('DE',
    'FR');
}
```

In some examples, policies can be more restrictive on attribute level. To achieve this, a WHERE condition can be defined behind the policy name. For example:

```
DEFINE POLICY salesOrdersOnlyDACH {
    USE salesOrders WHERE Country IN ('DE','CH','A')
}
```

In some implementations, AnyOf and AllOf can be distinguished with rules.

In some implementations, user attributes (e.g., provided from the IdP 308), can be used for rule checks. For example:
GRANT read ON * WHERE country=$user.countryCode
where $user.countrycode is an attribute indicating the location (country) of a user.

In some implementations, policies, actions, resoources, and/or rules can be combined. For example, policies can be combined using OR, actions identified within a rule can be combined as a list of actions using OR, resources identified within a rule can be combined as a list of resources using OR, and rules within a policy can be combined using OR.

In some implementations, optimizations can be provided within the DCL. For example, the term DEFINE can be omitted. For example:
DEFINE POLICY { }
is the same as
POLICY { }

In some implementations, annotations can be provided to achieve varying functionality. An example annotation includes @description, which is used to define a description of a policy. For example:

```
@description: 'Policy the read sales orders for Germany'
DEFINE POLICY salesOrders {
    GRANT read ON SalesOrders, SalesOrderItems WHERE
    Country = 'DE'
}
```

Another example annotation includes @plan, which is used to restrict the usage of a policy to a special service broker plan. For example:

```
@plan: 'mobilApps'
DEFINE POLICY salesOrders {
```

-continued

```
    GRANT read ON SalesOrders, SalesOrderItems WHERE
    Country = 'DE'
}
```

In some implementations, the CSL 324 is used by the application 320 to invoke policy evaluations for authorizations. When invoking a policy evaluation, the CSL 324 passes an attribute interface for the particular policy evaluation to the PDP 328, which processes the attribute interface to provide an outcome of the policy evaluation. The PEP 326 takes action based on the outcome (e.g., grant access, deny access).

Referring again to FIG. 3, and as introduced above, during a design-time of the application 320 a developer (e.g., the user 112a of FIG. 1) programmatically defines authorization definitions using the DCL of the present disclosure. That is, a policy definition file (e.g., DCL file (.dcl)) is provided for the application, which defines the policies to be applied during run-time of the application. An enterprise (e.g., customer) can subscribe for use of the application 320. In some examples, subscribing for use of the application can include registering an AMS and creating an AMS instance (e.g., the AMS 306 of FIG. 3) for the enterprise. In some examples, subscribing for use of the application can include registering an IAS and creating an IAS instance (e.g., the IAS 308 of FIG. 3) for the enterprise. In some examples, the AMS 306 is updated with an identifier of the IAS 308 to enable communication therewith.

In some implementations, one or more administrators (e.g., the user 112b of FIG. 1) can access the policy definition file to assign one or more roles to one or more policies recorded in the policy definition file to provide an enhanced policy definition file.

In some examples, the enhanced policy definition file is compiled to provide a policy enforcement file (e.g., .rego file that is in the REGO policy language). For example, the enhanced policy file is provided to a compiler as input and the compiler provides the policy enforcement file as output. The policy enforcement file is specific to the application 320 (i.e., instances of the application within respective containers of the cloud platform) and the enterprise (i.e., roles defined by the enterprise that is subscribed to use the application 320).

The policy enforcement file is stored in the storage service 312 and can be retrieved by the ADC 322. For example, the ABP 304 creates an authorization bundle that includes the policy file and stored in authorization bundle in the storage service 312. In some examples, the ADC 322 (i.e., OPA) obtains the authorization bundle for the application 320 actively by PUT mechanisms through a RESTful API or by PULLing the authorization bundle through a RESTful API. In this manner, role-policy and/or user-policy assignments are centrally managed (i.e., at the AMS 306), but are distributed to relevant application containers 302 for local enforcement (i.e., authorization checks) at the application containers 302 by the application 320 and the ADC 322.

In further detail, a user (e.g., employee of the entity that subscribes to the application 320) logs into the application 320. In some examples, the user is issued an authentication token upon successful log-in (e.g., JWT token). The user can interact with the application 320, an example interaction including the user requesting access to an entity (e.g., resource, environment, subject) and/or performance of some entity (e.g., action). To determine whether the user is authorized, the CSL 324 sends a request to the ADC 322 (e.g., checkAuthorization), which process the request based on the polic-y/-ies applicable to the application 320 (i.e., as provided in the authorization bundle received from the storage service 312). The ADC 322 provides a policy decision (e.g., grant, deny), which is enforced by the application 320. For example, the application 320 either grants the user access to or denies the user access to the entity. In some examples, the ADC 322 provides decision decisions (e.g., back to the ABP 304) for writing status and/or decision logs.

Figure 4:
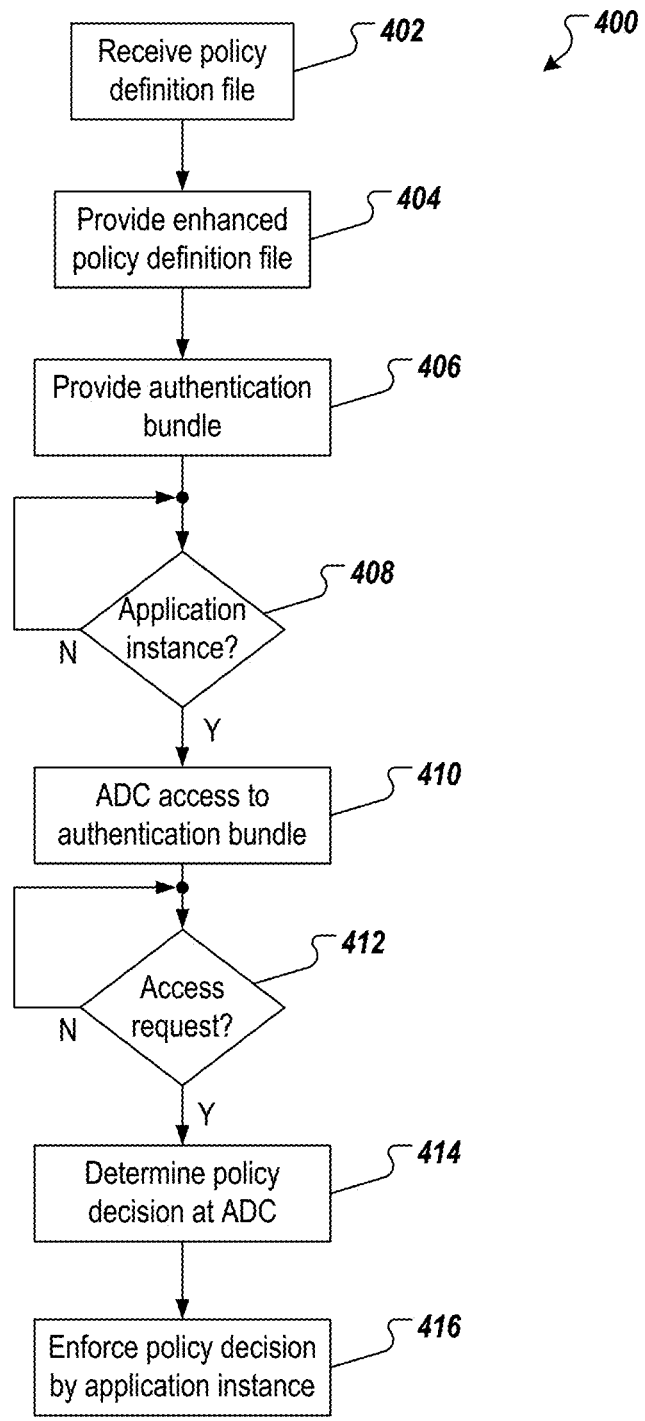
FIG. 4 depicts an example process in accordance with implementations of the present disclosure.

FIG. 4 depicts an example process 400 that can be executed in accordance with implementations of the present disclosure. In some examples, the example process 400 is provided using one or more computer-executable programs executed by one or more computing devices.

A policy definition file is received (402). For example, and as described in further detail herein, an AMS receives a policy definition file, the policy definition file defining one or more policies that are to be enforced during execution of one or more instances of an application within a cloud platform. An enhanced policy definition file is provided (404). For example, and as described in further detail herein, the AMS provides an enhanced policy definition file indicating authorizations for one or more roles for at least one policy of the one or more policies of the policy definition file. An authentication bundle is provided (406). For example, and as described in further detail herein, the authentication bundle is provided for execution of policy decisions at each instance of the application within the cloud platform, the authentication bundle being provided based on the enhanced policy definition file, the authentication bundle being distributed to multiple application containers within the cloud platform.

It is determined whether an instance of the application is instantiated (408). If an instance of the application is not instantiated, the example process 400 loops back. If an instance of the application is instantiated, an ADC accesses the authentication bundle (410). For example, and as described in further detail herein, an ADC (as an OPA) within an application container issues a request (e.g., get-Bundle) to a storage service to retrieve the authentication bundle. It is determined whether an access request has been made (412). For example, and as described in further detail herein, the instance of the application, executing within the application container, transmits an authorization request (e.g., checkAuthorization) to the ADC within the application container. In some examples, the ADC functions as an OPA and executes policy decisions based on the authentication bundle. If an access request has not been made, the example process 400 loops back. If an access request has been made, a policy decision is determined at the ADC (414). The policy decision is enforced by the application instance (416). For example, at least one policy decision is received by the instance of the application from the ADC, and enforces the at least one policy based on the policy decision.

Figure 5:
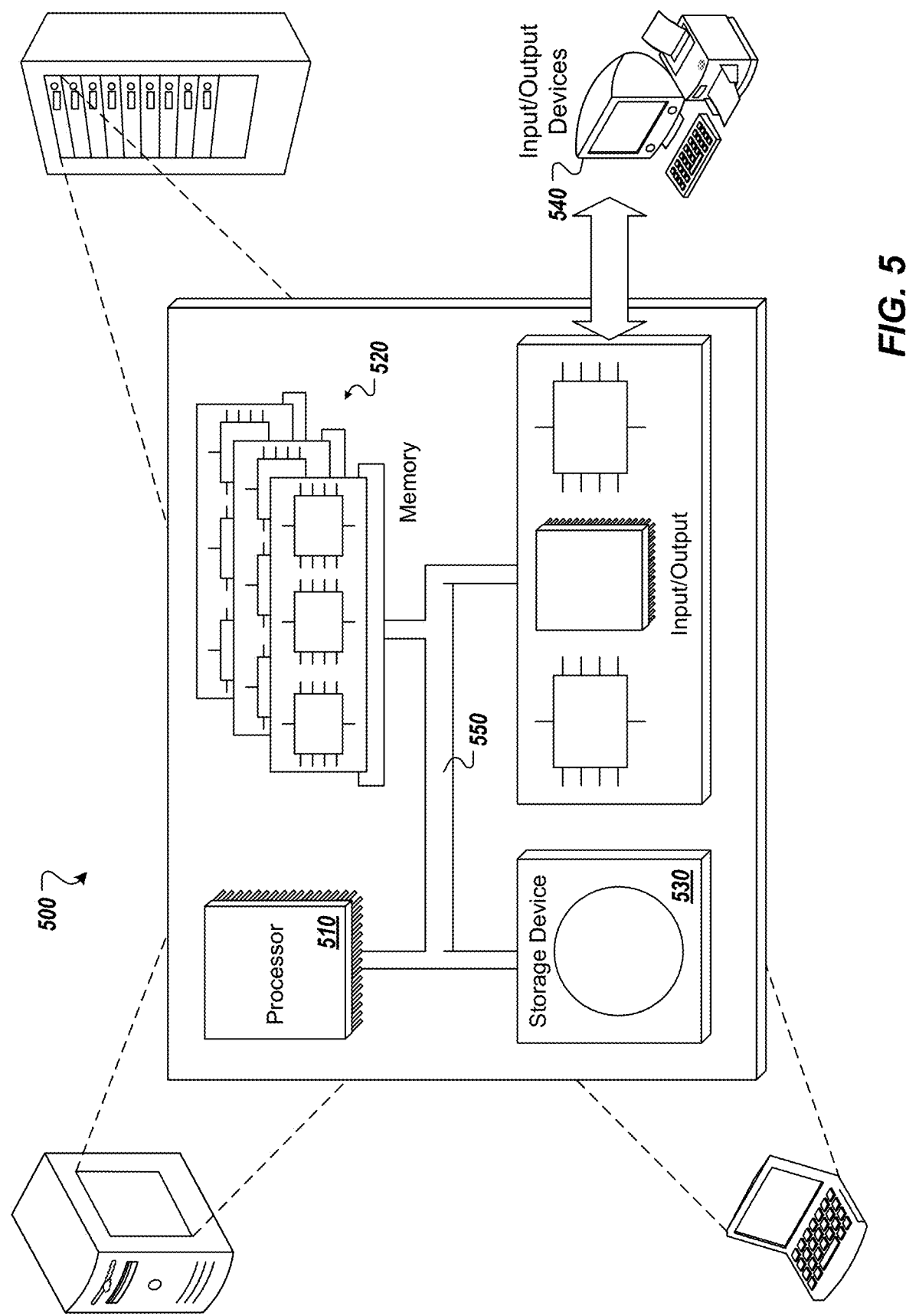
FIG. 5 is a schematic illustration of example computer systems that can be used to execute implementations of the present disclosure.

Referring now to FIG. 5, a schematic diagram of an example computing system 500 is provided. The system 500 can be used for the operations described in association with the implementations described herein. For example, the system 500 may be included in any or all of the server components discussed herein. The system 500 includes a processor 510, a memory 520, a storage device 530, and an input/output device 540. The components 510, 520, 530, 540 are interconnected using a system bus 550. The processor 510 is capable of processing instructions for execution within the system 500. In some implementations, the processor 510 is a single-threaded processor. In some implementations, the processor 510 is a multi-threaded processor.

The processor 510 is capable of processing instructions stored in the memory 520 or on the storage device 530 to display graphical information for a user interface on the input/output device 540.

The memory 520 stores information within the system 500. In some implementations, the memory 520 is a computer-readable medium. In some implementations, the memory 520 is a volatile memory unit. In some implementations, the memory 520 is a non-volatile memory unit. The storage device 530 is capable of providing mass storage for the system 500. In some implementations, the storage device 530 is a computer-readable medium. In some implementations, the storage device 530 may be a floppy disk device, a hard disk device, an optical disk device, or a tape device. The input/output device 540 provides input/output operations for the system 500. In some implementations, the input/output device 540 includes a keyboard and/or pointing device. In some implementations, the input/output device 540 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier (e.g., in a machine-readable storage device, for execution by a programmable processor), and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. Elements of a computer can include a processor for executing instructions and one or more memories for storing instructions and data. Generally, a computer can also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, for example, a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

A number of implementations of the present disclosure have been described. Nevertheless, it will be understood that various modifications may be made without departing from the spirit and scope of the present disclosure. Accordingly, other implementations are within the scope of the following claims.

What is claimed is:

1. A computer-implemented method for selective authorization of user access to one or more entities in a cloud platform, the method being executed by one or more processors and comprising:
   receiving, by an authorization management service, a policy definition file, the policy definition file defining one or more policies that are to be enforced during execution of one or more instances of an application within the cloud platform;
   providing, by the authorization management service, an enhanced policy definition file indicating authorizations for one or more roles for at least one policy of the one or more policies of the policy definition file;
   providing an authentication bundle for execution of policy decisions at each instance of the application within the cloud platform, the authentication bundle being provided based on the enhanced policy definition file, the authentication bundle being distributed to multiple application containers within the cloud platform; and
   during execution of an instance of the application within a container of the cloud platform:
      transmitting, by the instance of the application, an authorization request from the instance of the application to an authorization decision controller,
      receiving, by the instance of the application, a policy decision from the authorization decision controller, and
      enforcing, by the instance of the application, the at least one policy based on the policy decision.

2. The method of claim 1, wherein the instance of the application comprises a container security library that transmits the authorization request to the authorization decision controller.

3. The method of claim 1, wherein the policy decisions are executed by the authorization decision controller further based on a role of a user that the authorization request is made on behalf of.

4. The method of claim 1, wherein the authorization decision controller comprises an open policy agent that is executed within the container and that executes policy decisions based on the authentication bundle.

5. The method of claim 1, wherein providing the authentication bundle at least partially comprises compiling the enhanced policy definition file to provide a policy file in a computer-readable policy language.

6. The method of claim 1, wherein the one or more entities comprise at least one of a resource, an environment, an action, and a subject.

7. The method of claim 1, wherein the policy definition file is written in a data control language (DCL) that comprises structured query language (SQL) statements.

8. A non-transitory computer-readable storage medium coupled to one or more processors and having instructions stored thereon which, when executed by the one or more processors, cause the one or more processors to perform operations for selective authorization of user access to one or more entities in a cloud platform, the operations comprising:
   receiving, by an authorization management service, a policy definition file, the policy definition file defining one or more policies that are to be enforced during execution of one or more instances of an application within the cloud platform;
   providing, by the authorization management service, an enhanced policy definition file indicating authorizations for one or more roles for at least one policy of the one or more policies of the policy definition file;
   providing an authentication bundle for execution of policy decisions at each instance of the application within the cloud platform, the authentication bundle being provided based on the enhanced policy definition file, the authentication bundle being distributed to multiple application containers within the cloud platform; and
   during execution of an instance of the application within a container of the cloud platform:
      transmitting, by the instance of the application, an authorization request from the instance of the application to an authorization decision controller,
      receiving, by the instance of the application, a policy decision from the authorization decision controller, and
      enforcing, by the instance of the application, the at least one policy based on the policy decision.

9. The computer-readable storage medium of claim 8, wherein the instance of the application comprises a container security library that transmits the authorization request to the authorization decision controller.

10. The computer-readable storage medium of claim 8, wherein the policy decisions are executed by the authorization decision controller further based on a role of a user that the authorization request is made on behalf of.

11. The computer-readable storage medium of claim 8, wherein the authorization decision controller comprises an open policy agent that is executed within the container and that executes policy decisions based on the authentication bundle.

12. The computer-readable storage medium of claim 8, wherein providing the authentication bundle at least partially comprises compiling the enhanced policy definition file to provide a policy file in a computer-readable policy language.

13. The computer-readable storage medium of claim 8, wherein the one or more entities comprise at least one of a resource, an environment, an action, and a subject.

14. The computer-readable storage medium of claim 8, wherein the policy definition file is written in a data control language (DCL) that comprises structured query language (SQL) statements.

15. A system, comprising:
   a computing device; and
   a computer-readable storage device coupled to the computing device and having instructions stored thereon which, when executed by the computing device, cause the computing device to perform operations for selective authorization of user access to one or more entities in a cloud platform, the operations comprising:
      receiving, by an authorization management service, a policy definition file, the policy definition file defining one or more policies that are to be enforced during execution of one or more instances of an application within the cloud platform;
      providing, by the authorization management service, an enhanced policy definition file indicating authorizations for one or more roles for at least one policy of the one or more policies of the policy definition file;
      providing an authentication bundle for execution of policy decisions at each instance of the application within the cloud platform, the authentication bundle being provided based on the enhanced policy definition file, the authentication bundle being distributed to multiple application containers within the cloud platform; and
      during execution of an instance of the application within a container of the cloud platform:
         transmitting, by the instance of the application, an authorization request from the instance of the application to an authorization decision controller,
         receiving, by the instance of the application, a policy decision from the authorization decision controller, and
         enforcing, by the instance of the application, the at least one policy based on the policy decision.

16. The system of claim 15, wherein the instance of the application comprises a container security library that transmits the authorization request to the authorization decision controller.

17. The system of claim 15, wherein the policy decisions are executed by the authorization decision controller further based on a role of a user that the authorization request is made on behalf of.

18. The system of claim 15, wherein the authorization decision controller comprises an open policy agent that is executed within the container and that executes policy decisions based on the authentication bundle.

19. The system of claim 15, wherein providing the authentication bundle at least partially comprises compiling the enhanced policy definition file to provide a policy file in a computer-readable policy language.

20. The system of claim 15, wherein the one or more entities comprise at least one of a resource, an environment, an action, and a subject.

* * * * *